(12) United States Patent
Tamil et al.

(10) Patent No.: US 6,169,910 B1
(45) Date of Patent: Jan. 2, 2001

(54) FOCUSED NARROW BEAM COMMUNICATION SYSTEM

(75) Inventors: Lakshman S. Tamil, Plano, TX (US); Aubrey I. Chapman, deceased, late of Dallas, TX (US), by Rita Chapman, executrix; Douglas F. Carey, New York, NY (US)

(73) Assignee: Focused Energy Holding Inc.

(*) Notice: Under 35 U.S.C. 154(b), the term of this patent shall be extended for 0 days.

(21) Appl. No.: 09/345,916

(22) Filed: Jun. 30, 1999

Related U.S. Application Data

(63) Continuation of application No. 08/677,413, filed on Jul. 9, 1996, now abandoned, which is a continuation-in-part of application No. 08/497,624, filed on Jun. 30, 1995, now abandoned, which is a continuation-in-part of application No. 08/366,831, filed on Dec. 30, 1994, now abandoned.

(51) Int. Cl.$^7$ ...................................................... H04B 1/54
(52) U.S. Cl. ............................ 455/562; 455/25; 455/422; 455/447; 342/11; 343/753
(58) Field of Search ............................ 455/25, 422, 562, 455/524, 13.1, 447, 448; 343/754, 753, 911 R, 911 L; 342/11, 42, 51; 370/328, 334, 335, 336, 337

(56) References Cited

U.S. PATENT DOCUMENTS 3,487,413   12/1969   Shores .

FOREIGN PATENT DOCUMENTS

| 44 30 832 | 11/1995 | (DE) . |
| 0 015 018 | 9/1980 | (EP) . |
| WO 96/21164 | 7/1996 | (WO) . |

OTHER PUBLICATIONS

International Search Report dated Oct. 23, 1997.

Translation of German Patent 44 30 832 by the Ralph McElroy Co., Custom Division P.O. Box 4828, Austin Texas 78765 USA.

Mitchell, et al., "A Multiple–Beam Multiple–Frequency Spherical Lens Antenna System Providing Hemispherical Coverage," *Georgia Institute of Technology, USA, Naval Ocean Systems Center*, USA, 394–398.

*Primary Examiner*—Lee Nguyen
(74) *Attorney, Agent, or Firm*—Fulbright & Jaworski

(57) ABSTRACT

A system for establishing and utilizing a wireless communication system using a lens antenna having a dielectric material lens. The lens focuses output radio frequency (rf) signals into narrow beam rf signals which are directed to a specific receiving communication device. The lens focuses input rf signals onto signal processing equipment. A communication system between two or more communication devices which utilizes a dielectric material lens and signal processing equipment can be used for point-to-point or point-to-multipoint communication.

36 Claims, 6 Drawing Sheets

FOCUSED NARROW BEAM COMMUNICATION SYSTEM

This is a continuation of application Ser. No. 08/677,413, filed Jul. 9, 1996, entitled FOCUSED NARROW BEAM COMMUNICATION. Application Ser. No. 08/677,413 is a continuation-in-part of Ser. No. 08/497,624, filed on Jun. 30, 1995 now abandoned. Application Ser. No. 08/497,624 is a continuation-in-part of Ser. No. 08/366,831, filed on Dec. 30, 1994 now abandoned.

BACKGROUND OF THE INVENTION (1) Field of the Invention

This invention relates to line-of-sight wireless communication systems for microwave and millimeter wave communication, and more particularly to a wireless communication system for point-to-point or point-to-multipoint communication which uses a dielectric material lens antenna to focus received or transmitted information carrying radio frequency (rf) signals.

(2) Description of Related Art

The design of many radio frequency (rf) communication systems is based on stationary reflective, parabolic antennas. Such antennas are capable of transmitting and receiving narrow beam rf signals. A major disadvantage of such antennas is that they are not directionally agile. Such antennas can only transmit signals in one direction. This means that a communication system based on parabolic antennas typically has a series of antenna arrays, each array comprising a plurality of antennas for receiving incoming signals, and another plurality of antennas for transmitting signals to the next antenna array. These systems are typically used for transmitting signals over long distances.

Another type of wireless communication system is cellular communication. For cellular communication between a first communication device and a second communication device within a cell, the communication devices broadcast and receive signals from and to a base station. The frequency of the signals broadcast from the base station and the frequency of the signals received by the base station are different. The different frequencies allow for simultaneous reception and transmission of information by a communication device. The ability to simultaneously receive and transmit information in one device is called duplex communication.

The base station of a cellular cell typically comprises an antenna array having circuitry and computer control for receiving incoming signals, for transforming the signals without losing the information carried by the received signals, and an array of transmit antennas for transmitting the transformed signals to another communication device. Typically, each antenna is a dipole antenna. A major disadvantage of the transmit antennas currently used is that the antennas broadcast omnidirectionally. A more efficient communication system can be established if the transmit antennas are capable of beaming a signal directly to a desired receiver or receivers.

In wireless communications, signal fading is a major problem. Minimizing or eliminating the effects of fading is important to successful free-space communication. Some methods for curing the fading problem are space diversity, frequency diversity, time diversity, and polarization diversity broadcasting.

In wireless communications it is also desirable to be able to accommodate a large number of simultaneous users without a loss in signal quality due to interference from other information signals. Several methods for increasing the number of users that can use a communication system at the same time have been developed. Among these methods are frequency division multiplexing, time division multiplexing, code division multiplexing, and space division multiplexing.

In wireless communication, it is desirable for a base station to have a beam forming antenna. A beam forming antenna is an antenna that has the capability to form multiple rf beams which can be directed beams in selected directions. With such a capability, the base station and adjacent base stations can employ frequency reuse. Frequency reuse is the ability of a base station and adjacent base stations to use the same frequency to communicatively connect different users in separate communication systems without interference due to the use of the same frequency. The ability to employ frequency reuse increases the number of users who can use a communication network. With current cellular communication systems, frequency reuse is employed in cells that are separated by a sufficient distance so that the signals from a first cell using a particular frequency will not interfere with the signals of another cell using the same frequency. With beam forming antenna, frequency reuse can be utilized within a cell and between adjacent cells.

U.S. Pat. No. 5,485,631, issued to Bruckert describes a multiple sectorized antenna system which achieves a low reuse factor. The reuse factor characterizes the proximity of the closest base station which can reuse a particular frequency. U.S. Pat. No. 5,260,968, issued to Gardner et al., describes a communication system which uses a multiple array antenna and space division multiplexing. U.S Pat. No. 4,819,227, issued to Rosen, shows beam forming for frequency reuse in satellite communication systems. Again, the system uses a multiple antenna array for beam forming. U.S. Pat. No. 4,730,310, issued to Acampora et al., shows a communication system which uses a large main reflector or a phased array antenna in conjunction with time division multiplexing to provide a communication system capable of frequency reuse within a communication cell.

A key aspect of the present invention is the use of a dielectric material lens in a communication system to focus received or transmitted rf signals which pass through the lens. Such lenses have been used in other arts for many years. The lenses have been used as passive reflectors, and as antennas in radar systems involving navigation and aircraft landing. U.S. Pat. No. 3,703,723, issued to Albanese et al., describes a Luneberg lens used as a passive reflector. U.S. Pat. No. 4,287,519, issued to Doi, describes a Luneberg lens used as an antenna system which takes the place of three separate high gain antennas. U.S. Pat. No. 4,031,535, issued to Isbister, describes a multiple frequency navigation radar system for determining the location and identification of navigational markers.

U.S. Pat. No. 4,806,932, issued to Bechtel, describes a radar-optical transponding system for use in aircraft landing systems. A transceiver on an aircraft sends a signal to a ground based lens. The lens focuses the signal onto a transponder array, which adds identifier information and meteorological data to the signal and re-transmits the signal back to the aircraft's transceiver. The signal transmitted to the aircraft is used to guide the aircraft.

SUMMARY OF THE INVENTION (1) Progressive contribution to the art

We have invented a communication system for point-to-point or point-to-multipoint communication which uses a dielectric material lens antenna to focus received or transmitted rf energy. The communication system is capable of serving multiple users and of handling multiple simultaneous communication links between various users. The communication system can be designed so that the lens is used only to transmit rf signals. Alternatively, the communication system can be designed so that the lens is capable of simultaneously transmitting and receiving rf signals. The lens is directionally agile, and is capable of receiving and transmitting signals throughout a 360 degree area surrounding the lens.

When used to receive rf energy, the dielectric material lens focuses incoming rf signals onto signal processing equipment. When used to transmit rf energy, the dielectric material lens focuses outgoing rf signals into narrow beam signals which are transmitted directly to a desired receiver or receivers.

The lens and signal processing equipment can be directly connected to a communication device, or the lens and signal processing equipment can act as a repeater, also called a base station. If the lens and signal processing equipment are directly connected to a communication device, signals received by the lens are fed to the signal processing equipment, and the resulting signal is sent to a user interface. Output signals from the user interface are processed by the signal processing equipment and sent to the lens where the signals are broadcast as narrow beam rf signals directly to a second communication device or communication devices.

If the lens and signal processing equipment are used as repeater, a first communication device broadcasts rf signals to the lens, and the lens sends the signals to the signal processing equipment. The signal processing equipment sends processed signals back to the lens which broadcasts the signals as narrow beam rf signals directly to a second communication device or communication devices.

A lens and corresponding signal processing equipment can be used to simultaneously establish many separate communication systems between various users.

(2) Objects of this invention

An object of this invention is to provide a wireless communication system which uses a dielectric material lens to focus transmitted rf signals into narrow beam rf signals.

Another object is to provide a wireless communication system which uses a dielectric material lens to focus received rf signals onto signal processing equipment.

Another object is to provide a communication system which uses a lens to broadcast narrow beams of rf signals directly to a desired receiver or receivers.

Another object is to provide a wireless communication system capable of providing point-to-point or point-to-multipoint duplex communication for a large number of simultaneous users.

Another object is to provide a communication system which is capable of using frequency diversity, space diversity, or polarization diversity broadcasting to eliminate or minimize the problem of signal fading.

Another object is to provide a communication system which is capable of using code division multiplexing, time division multiplexing, frequency division multiplexing or space division multiplexing to increase the maximum number of simultaneous users that the communication system can accommodate.

Another object is to provide a communication system which can employ frequency reuse to increase the number of simultaneous users that the communication system can accommodate.

Another object is to provide a local area network communication system.

Another object is to provide a lens and signal processing equipment which can be used as a base station of a cellular network.

Further objects are to achieve the above with a system which is sturdy, compact, durable, simple, safe, efficient, versatile, ecologically compatible, energy conserving and reliable; yet is inexpensive and easy to manufacture, install, maintain and use.

The specific nature of the invention, as well as other objects, uses, and advantages thereof, will clearly appear from the following description and from the accompanying drawings, the different views of which are not necessarily scale drawings.

As an aid to correlating the terms of the claims to the exemplary drawings the following catalogue of elements is provided:

| | | | |
|---|---|---|---|
| 10 | communication system | 52 | amplifier |
| 12 | communication device | 54 | band-pass filter |
| 14 | dielectric material lens | 56 | amplifier |
| 16 | signal processing equipment | 57 | signals from receive module |
| 17 | narrow beam signals | 58 | gain control |
| 18 | direct connected communication device | 60 | amplifier |
| | | 62 | gain control |
| 19 | omnidirectional signals | 64 | mixer |
| 20 | user interface | 66 | oscillator |
| 22 | coaxial cable | 68 | amplifier |
| 24 | base station | 70 | mixer |
| 26 | received signals | 72 | supervisory signals |
| 28 | end-fire antenna | 74 | band-pass filter |
| 30 | convex shaped lens | 76 | amplifier |
| 32 | array | 78 | output signals |
| 34 | feed device | 79 | signals from user interface |
| 36 | receive module | 80 | information |
| 38 | transmit module | 82 | information |
| 40 | cross connect | 84 | connector |
| 42 | duplex switch | 86 | broadcast station |

-continued

| 44 | controller | 88 | switching station |
| 46 | low noise amplifier | 90 | other type of communication system |
| 48 | mixer | | |
| 50 | oscillator | 92 | tower |

DESCRIPTION OF THE PREFERRED EMBODIMENTS

Figure 1:
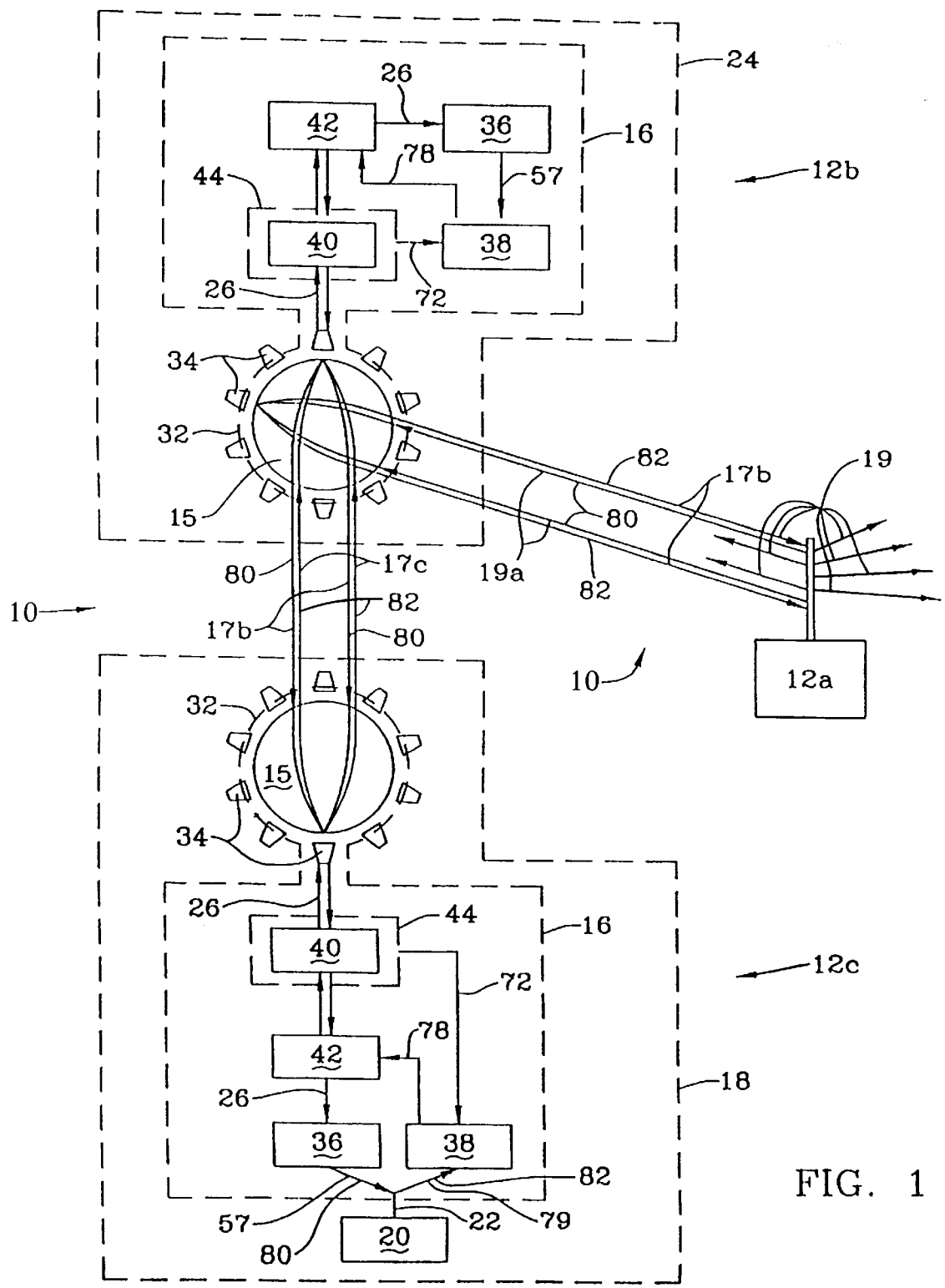
FIG. 1 is a diagram of a communication system between a direct connected communication device, a base station, and a third communication device.
Figure 2:
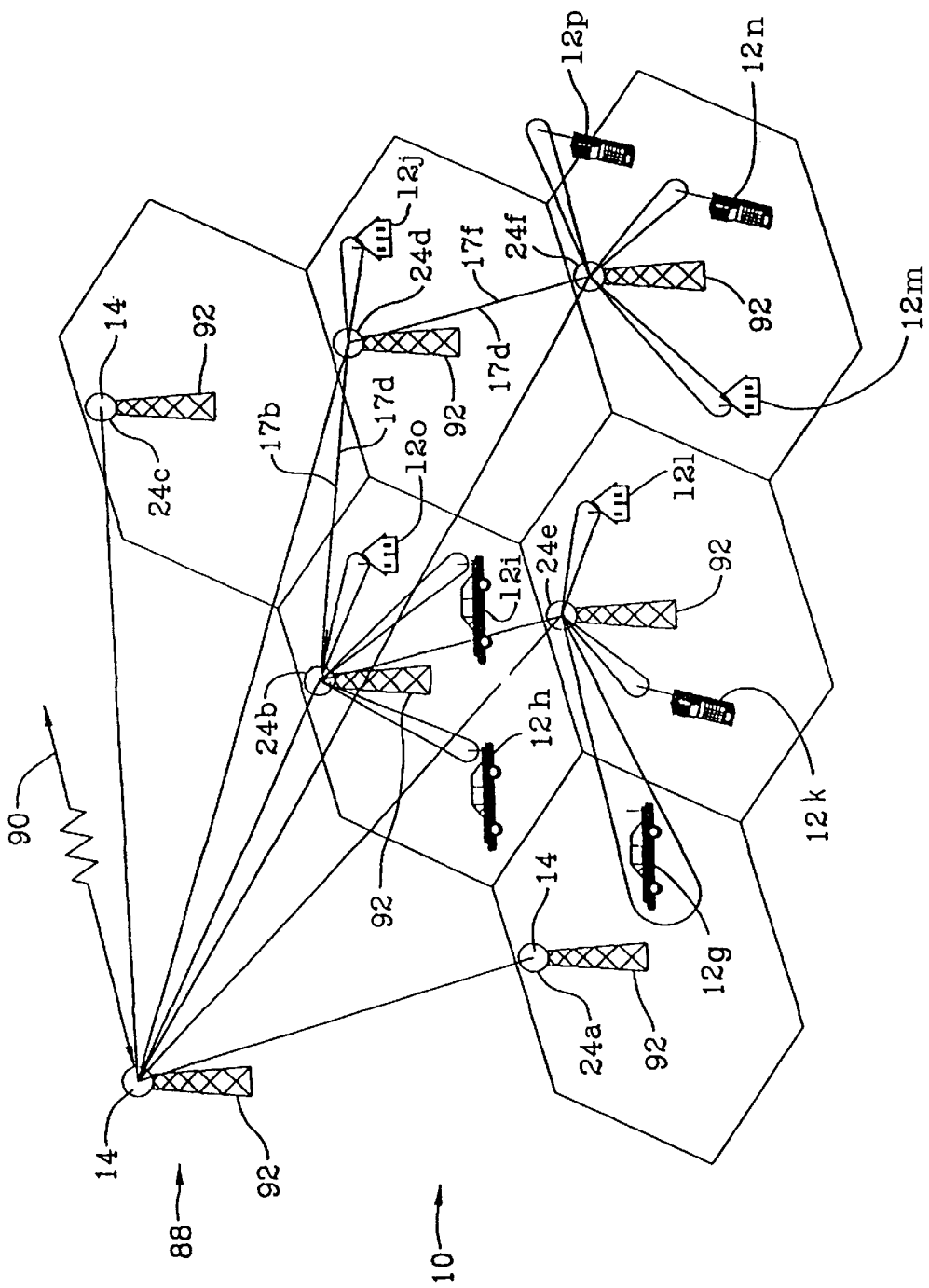
FIG. 2 is a diagram of a cellular network where separate cells are represented pictorially as hexagons.
Figure 3:
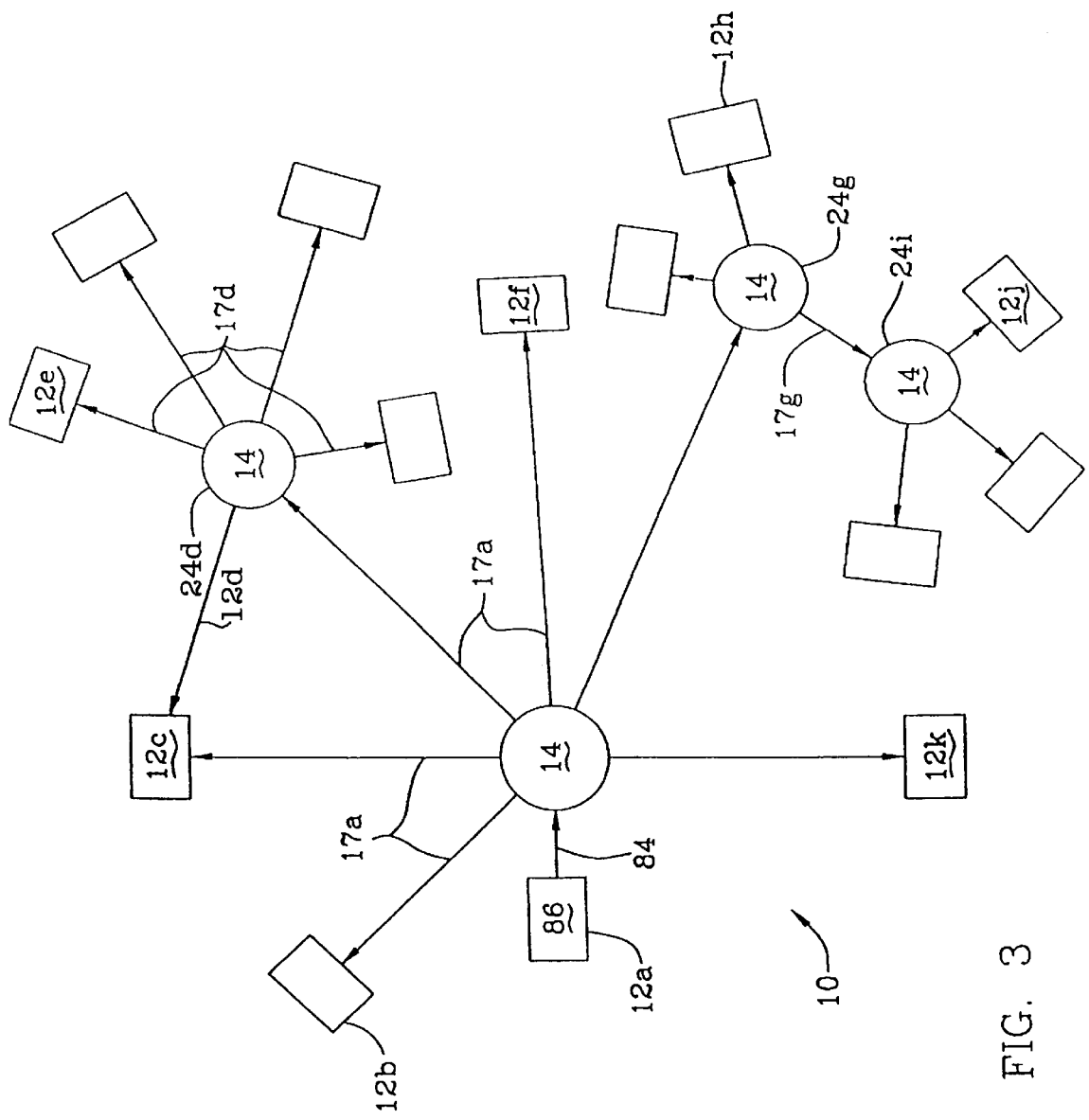
FIG. 3 is a diagram of a point-to-multipoint communication system.

With reference to the drawings, and in particular to FIGS. 1, 2, and 3 a communication system is designated generally as 10. The communication system is comprised of at least two communication devices 12, with at least one of the communication devices having a lens antenna 14. The lens antenna is comprised of a dielectric material lens 15, and signal processing equipment 16. The lens antenna can be used to transmit and receive radio frequency signals as shown in FIGS. 1 and 2. In a second embodiment of the invention, as shown in FIG. 3, the lens and signal processing equipment are used only to transmit rf signals as narrow beams directly to another communication device or communication devices.

As indicated in the drawings, each communication device is given an individual alphanumeric designation. For example, 12a and 12b are two distinct communication devices. Also, information carrying signals that are received by or transmitted to a communication device are given alphanumeric designations, where the alphabetic character indicates the transmission source of the signal. For example, rf signal 17b is a rf signal that was transmitted from communication device 12b. The information carried in an input or output rf signals can be voice or data information; or the information can be the signal itself, for example, a distress signal.

A communicative connection formed by rf signals transmitted between a communication device 12, a lens antenna 14 and another communication device 12 forms a communication system. A communication network is formed by all of the communication systems which can connect various users together. As shown in FIGS. 2 and 3, several individual communication devices 12 can be used to create the communication network used to communicatively connect a first communication device to a second communication device.

The communication devices 12 are devices which are capable of transmitting and/or receiving radio frequency signals. Some examples are cellular phones; pagers; and computers, televisions, automatic teller machines, and other electronic equipment which is connected to a transmitter and/or a receiver. Also, a lens antenna 14 of this invention or a base station of a cellular network is a communication device 12.

The lens antenna 14 can be a component of a communication device 12 that is directly connected to the communication device. Such direct connected communication devices 18, as shown in FIG. 1, are comprised of a lens 15, signal processing equipment 16, and user interface 20. The user interface is directly connected to the signal processing equipment by any conventional means; such as coaxial cable 22, fiber optic cable, or wiring.

Alternatively, the lens antenna 14 can be base station 24. As shown in FIG. 1, the base station, also designated as 12b, functions as a relay or repeater between two separate communication devices 12a and 12c. The base station communicatively connects communication device 12a to communication device 12c by narrow beam rf signals 17.

Figure 4:
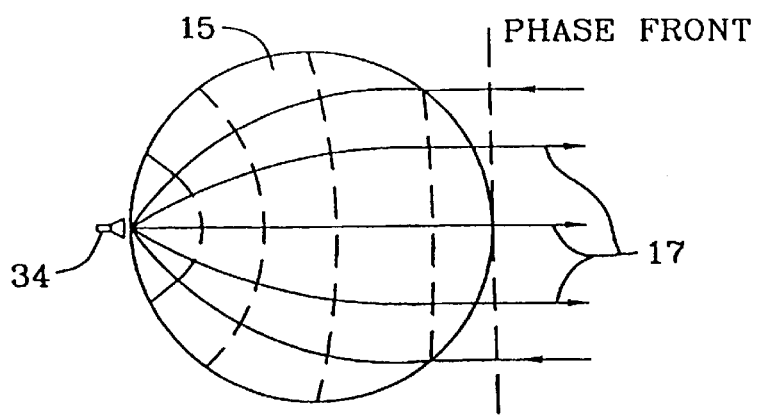
FIG. 4 is a diagram of the beam focusing pattern of received and transmitted rf energy for a spherical Luneberg lens where one focal point is located on the surface of the sphere and the other focal point is located at infinity.

The dielectric material lens 15 is preferably a variable refractive index lens, such as a Luneberg lens. FIG. 4 shows a diagram of the beam focusing pattern of received and transmitted rf energy for a spherical Luneberg lens.

Figure 5:
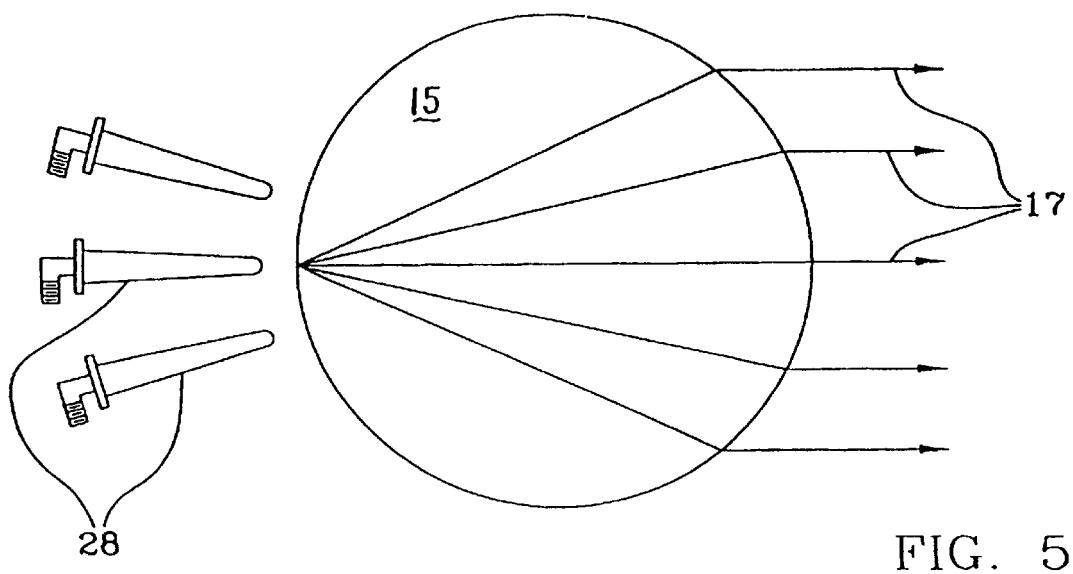
FIG. 5 is a diagram of a constant-K lens fed with end-fire feeds.

A dielectric material lens 15 made of a material having a constant refractive index may be used as a somewhat optically degraded substitute for a variable refractive index lens. Such a lens is a constant dielectric constant (constant-K) lens and is shown in FIG. 5. The lens has focusing properties similar to those of a variable refractive index lens, but small aberrations in the resulting focused beam are present. Such aberrations are small for most practical applications and have negligible effect. For a constant-K lens, the dielectric constant should be within the range of approximately 2.0 to 3.5. Some of the aberrations of such a lens are diminished when the lens is fed by dual frequency end-fire antenna 28, as shown in FIG. 5.

Figure 6A:
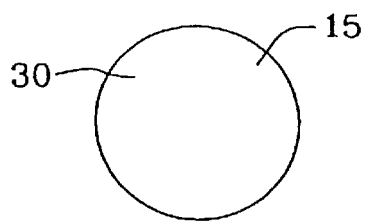
FIG. 6A is a front view of a convex shaped dielectric lens.
Figure 6B:
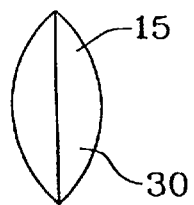
FIG. 6B is a side view of a convex shaped dielectric lens.

A lens 15 used in the communication system 10 of the present invention is preferably spherical, but other shapes can be used for specific applications. The lens should have a shape wherein at least one surface of the lens is a quadric surface. For example, a convex shaped lens 30, as shown in FIG. 6A and 6B, can be used if full 360° directional agility is not desired or required. One application for such lenses is in long distance rf signal transmission systems.

The directivity and beam width of a focused beam 17 output from a lens 15 can be controlled by modifying the illumination taper and by radially adjusting the effective phase center of feed device 34 with respect to the focal point of the lens. The beam width of a signal broadcast through the lens is also a function of the wavelength of the signal, and of the diameter of the lens.

Figure 7:
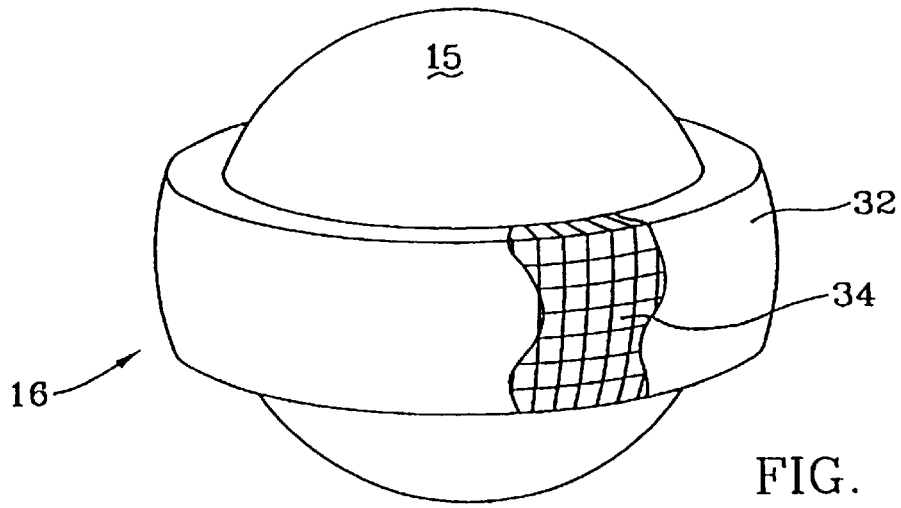
FIG. 7 is a view of a spherical dielectric material lens with a partial cut away of the array of feed devices.

As shown in FIGS. 1 and 7, the signal processing equipment 16 comprises array 32 of feed devices 34, receive modules 36, transmit modules 38, cross connect 40, duplex switch 42, and controller 44. The number and positioning of the feed devices of the feed device array surrounding the lens 15 determines the directional range of the communication system. Preferably, the feed device array encircles the lens, providing a full 360° directional range. Typical feed devices include small aperture waveguide horns, open end waveguides, dielectric-loaded waveguides, patch antennas, and end-fire antennas. The array can be made of a combination of types of feed devices, for example, the array could be comprised of dual frequency patch antennas covering a portion of the lens, and rf horns covering another portion of the lens. Preferably, the feed devices are patch antennas so that the feed devices do not block a signal from passing through and beyond the lens. When a feed device broadcasts a signal through the lens, the signal is focused into a narrow beam signal which occupies a fixed solid angle in space.

Receive modules 36 and transmit modules 38 are connected to each feed device 34 of the feed device array 32. A single transmit module and a single receive module can be used to feed and receive to and from the feed device array, but it is preferable to have several interconnected receive and transmit modules, so that a receive module and a transmit module handle only a portion of the feed device array. The exact number of receive or transmit modules required is a function of the user load that the lens handles.

Figure 8:
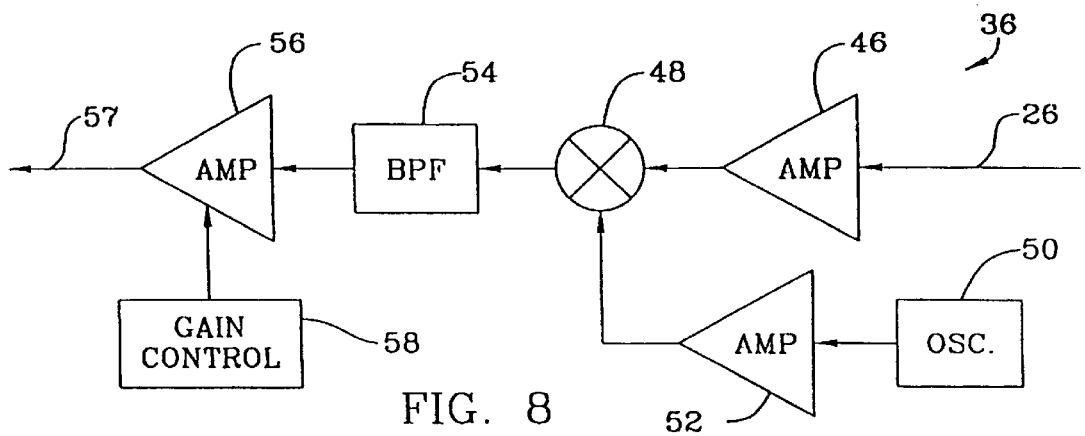
FIG. 8 is a block diagram of a receive module.

A receive module 36 receives focused receive signals 26 that were fed to a feed device 34 from the lens 15. FIG. 8 shows a block diagram of a basic embodiment of the receive module circuitry. The received signals from the lens are routed to low noise amplifier 46. The amplified signals are sent to mixer 48. Reference signals which are generated by oscillator 50 and amplified by amplifier 52 are also sent to the mixer 48. The mixer product is sent to band-pass filter 54 to filter out unwanted mixer products. The resulting signals are sent to amplifier 56. Gain control signals from gain control 58 control the gain of amplifier 56. Resulting signals 57 are passed to a transmit module 38 if the communication device is a base station 24, or the resulting signals are passed to a user interface 20 if the communication device is a direct connected communication device 18.

Figure 9:
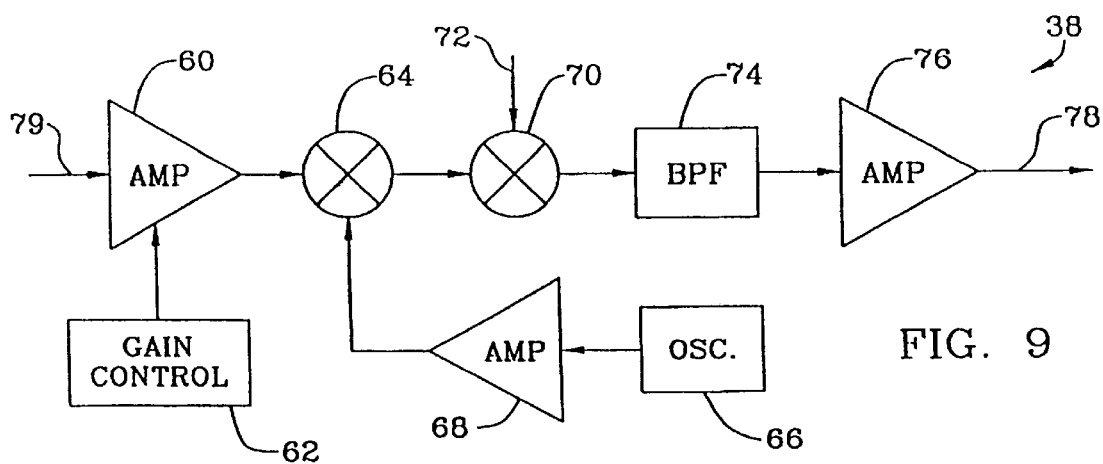
FIG. 9 is a block diagram of a transmit module for a direct connected communication device.

A transmit module 38 sends output signals 78 to a feed device 34. FIG. 9 shows a block diagram of a basic embodiment of the transmit module circuitry for a direct connected communication device 18. Signals 79 from the user interface 20 are sent to amplifier 60. Gain control signals from gain control 62 control the gain of the amplifier 60. The signals from the amplifier 60 are sent to mixer 64. The mixer 64 is also fed with reference signals which are generated by oscillator 66 and amplified by amplifier 68. The resulting signals are sent to mixer 70. Mixer 70 is also fed with supervisory signals 72 from controller 44. The resulting signals are sent to band-pass filter 74. The signals are then sent to amplifier 76, which generates output signals 78.

Figure 10:
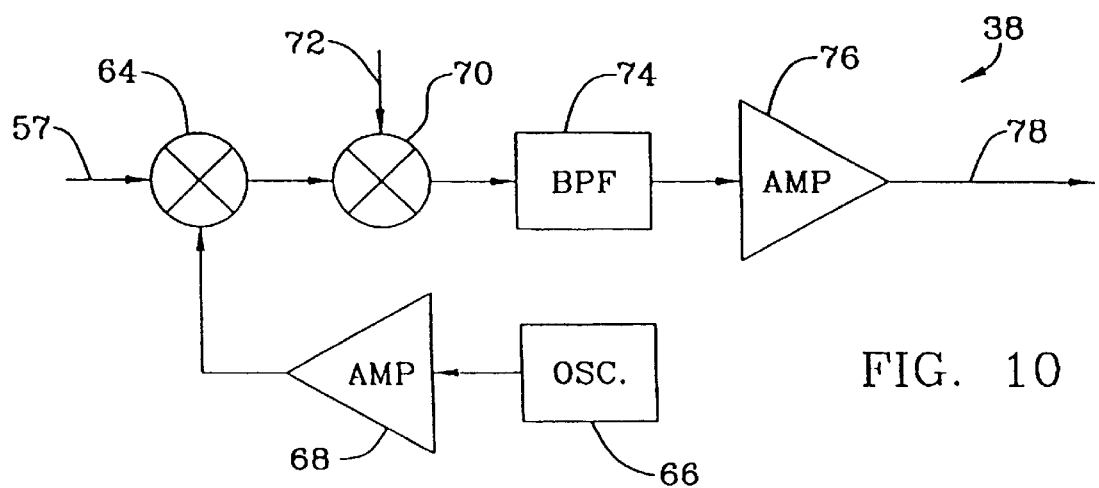
FIG. 10 is a block diagram of a transmit module for a base station.

FIG. 10 shows a block diagram of a basic embodiment of transmit module circuitry for a base station 24. Input signals 57 from the receive module are sent-to mixer 64. The mixer 64 is also fed with reference signals which are generated by oscillator 66 and amplified by amplifier 68. The resulting signals are sent to mixer 70. Mixer 70 is also fed with supervisory signals 72 from controller 44. The resulting signals are sent to band-pass filter 74. The signals are then sent to amplifier 76, which generates output signals 78.

As shown in FIG. 1, and regardless of whether the communication device 12 is a base station 24 or a direct connected communication device 18, output signals 78 from the amplifier 76 of the transmit module 38 are sent through the duplex switch 42, the cross connect 40, and a feed device 34. The feed device transmits the signals to the lens 15, which converts the signals to narrow beam rf signals 17. A cross connect and/or a duplex switch are not necessary for all applications.

The transmit module 38 adds supervisory signals 72 to the signal stream in the transmit module. The supervisory signals are supplied to the transmit module by the controller 44. Typically, the supervisory signals contain information relating to the source and destination of the signal, as well as identification of the device 12 that has most recently broadcast the signal. This information is used to ensure that a signal is broadcast to a desired location. If a lens antenna 14 receives signals which do not have supervisory signals indicating that the signals are sent to the lens antenna which received the signals, the signal processing equipment 16 will not process the signals.

The cross connect 40 allows the controller 44 to direct the output signals 78 from a transmit module 38 to the proper feed device 34 or feed devices that will ensure that the output rf signals from a lens 15 will reach the proper destination.

For a communication system 10 where the lens antenna 14 are used only to transmit signals to other devices 12, as shown in FIG. 3, the controller 44 for broadcast station 86, and the controller 44 for any base station 24 that receives the broadcast signals, stores location information for all devices that are to receive narrow beam signals 17 transmitted from the broadcast station or base stations. The location information is used by the controller 44 and the cross connect 40 to ensure that output signals 78 are fed to the proper feed device 34 or feed devices so that desired communication devices 12 will receive the narrow beam signals 17 transmitted from the broadcast station 86 or base stations 24.

As shown in FIG. 1, in a communication system 10 in which all communication devices 12 of the system receive and transmit rf signals, a first communication device, such as 12b, transmits signals 78 through the same feed device 34 which received signals 19a from a second communication device 12a. In this type of system, the cross connect 40 and controller 44 direct output signals 78 through the same feed device which receives signals from the communication device being transmitted to. This eliminates the need for storing information relating to the location of communication devices within a communication network.

The duplex switch 42 prevents output signals 78 from being received by the feed device array 32 and being re-processed by the signal processing equipment 16 when the output signals 78 are broadcast through the lens 15. If the lens antenna 14 is used only to transmit rf signals, a duplex switch is not needed.

The controller 44 provides the supervisory signals 72 to the transmit module. The controller in conjunction with the cross connect 40 determines which feed device 34 of the feed device array 32 the output signals 78 are sent to so that the corresponding narrow beam rf signals 17 that are broadcast from the lens 15 will reach a desired communication device 12.

The circuitry of the receive and transmit modules 36, 38 and of the controller 44 can incorporate systems for minimizing the effect of signal fading, and for increasing the number of users who can simultaneously use the communication system. Space diversity, time diversity, frequency diversity, and polarization diversity circuitry can be incorporated in the signal processing equipment to minimize the effect of signal fading. Also, time division multiplex, frequency division multiplex, polarization division multiplex, code division multiplex and space division multiplex circuitry can be incorporated in the signal processing equipment to increase the number of users who can simultaneously use the communication system. Such circuitry is known in the art of cellular communication and is not described in detail here.

The electronic sub-systems that comprise a receive module 36 and/or a transmit module 38 can be made from separate components, or the components can be combined onto an integrated circuit, such as a monolithic microwave integrated circuit.

The lens 15 of a direct connected communication device 18, or the lens 15 of a base station 24 forms narrow beam rf signals 17 which are transmitted to desired communication devices 12. Because the beams are narrow and directionally oriented, adjacent cells in a cellular network can reuse some of the frequency spectrum used by communication devices which broadcast narrow beam signals in a neighboring cell as long as the narrow beam signals do not overlap and interfere with each other. This is known as frequency reuse. Frequency reuse by a single lens antenna 14 can be accomplished by using polarization division multiplexing, space division multiplexing, code division multiplexing, or time division multiplexing to broadcast separate signals on the same frequency.

As noted above, a communication system 10 is comprised of at least two communication devices 12, at least one of which has a dielectric material lens 15 and signal processing equipment 16. The dielectric material lens focuses received and transmitted rf signals. Signals transmitted and/or received by the lens are processed by the signal processing equipment Such communication systems are shown in FIGS. 1, 2, and 3.

FIG. 1 shows a direct connect communication device 18 which is communicatively connected to a base station 24, which in turn is communicatively connected to another communication device 12a. In FIG. 1, the direct connect device is indicated generally as 12c and the base station is indicated generally as 12b. The communication device 12c broadcasts omnidirectionally as indicated by reference numerals 19.

As shown in FIG. 1, direct connect communication device 18 is connected directly to the lens antenna 14. In this embodiment, received rf signals carrying information 80 are focused by the lens 15 onto the signal processing equipment 16. The signal processing equipment receives signals 26 from the lens. The information contained in the signals 26 is sent from the signal processing equipment to user interface 20 of the communication device. Output signals 79 from the user interface, which carry information 82, are sent to the signal processing equipment. The output signals 78 from the signal processing equipment are passed through the lens and broadcast as narrow beam rf signals 17 to another communication device, which is base station 24 in FIG. 1.

Also as shown in FIG. 1, a lens antenna 14 can function as a base station 24. A communication device 12c broadcasts input rf signals, which carry information 82, to the lens 15 of the base station. The lens focuses the received signals 26 onto the signal processing equipment 16. The signal processing equipment processes the received signals, and sends output signals 78 back to the lens. The output signals are passed through the lens and broadcast as narrow beam rf signals 17 which still carry the information 82. The narrow beam signals are transmitted to another communication device, 12a as shown in FIG. 1.

The communication systems between the three communication devices 12a, 12b, and 12c in FIG. 1 form a full duplex communication network. The direct connect communication device 18 receives information 80 at the same time that it broadcasts information 82. Likewise, communication device 12a receives information 82 at the same time that it broadcasts information 80. The base station 24 functions as a relay or repeater between the other two communication devices. The base station 24 of FIG. 1 connects communication device 12a to communication device 12c. The base station can simultaneously connect many other communication devices together.

FIG. 2 shows a cellular network where the base stations are referenced as 24a–f. Central switching station 88 can connect to other types of communication networks, such as a wire or cable connected communication system, or a long distance rf signal transmission system. This is represented in FIG. 2 by reference number 90. Also, the central switching station is interrogated by the base stations to determine the target locations of desired communication devices 12 and the most efficient route for sending signals to the desired communication devices. For example if communication device 12o which is served by base station 24b is used to communicate with communication device 12p, which is served by base station 24f, the switching office could route the communication through base station 24d, as shown, or base station 24e. Also, if one of the base stations used in a communication link fails or becomes overburdened, the switching office can re-route communication traffic through other base stations.

Generally, a communication device 12 has a transmitter and a receiver, although there are applications where a communication device is not required to have both a transmitter and a receiver. For example, a point-to-multipoint wireless communication system 10 can be used to broadcast signals to many different receivers 12, as shown in FIG. 3. The lens antenna 14 receives signals from broadcast station 86. The station can be directly connected to the lens antenna by connector 84, as shown in FIG. 3, or the station can transmit rf signals to the signal processing equipment 16. The broadcast station broadcasts signals through the lens as narrow beam signals 17 to each of the receivers. The broadcast station 86 does not receive signals, so the broadcast station does not have a receive module 36, or a duplex switch 42. Since the receivers 12 do not broadcast information back to the broadcast station, the receivers are not equipped with transmitters. The number of users who can receive the signals broadcast by the broadcast station can be greatly increased if the signals are broadcast to several base stations 24, which in turn re-transmit the signals as narrow beam signals to various users.

As shown in FIG. 3, a communication device 12c may receive narrow beam signals 17 from two or more different lens antennas 14. In FIG. 3, communication device 12c receives signals 17a and 17d. The circuitry (not shown) of the communication device would be able to distinguish the best signal and use that signal. Alternatively, the communication device could use both signals. Also, the signals 17a and 17d received by communication device 12c would not necessarily have to carry the same information.

FIG. 3 shows a point-to-multipoint communication system in which the lens 14 and signal processing equipment 16 are used for transmission only. A system can be designed so that the lens and signal processing equipment can accommodate both transmission and reception of signals in a point-to-multipoint system by including receive modules 36, transmit modules 38, and duplex switches 42 in the signal processing equipment of each lens 14 which is to receive and transmit; and by having transmitters and receivers in each communication device which receives the originally broadcast signals.

To establish a communication system in an isolated local area network, the controller 44 can store information concerning the location of all the communication devices 12 within the network and broadcast signals directly to desired communication devices. As an alternative, an inquiring communication device can broadcast an inquiry signal throughout the directional range of the lens antenna 14. The inquiry signal when received by the desired communication devices would cause the desired communication devices to send response signals back to the inquiring lens. The inquiring communication device can then transmit signals through the feed devices 34 which received the response signals. This establishes a direct communication system between the inquiring communication device and a second communication device. Establishing a communication system in a cellular network is well known in the art of cellular communication and is not described here.

When the location of the target receiver is determined, the controller 44 will direct output signals 78 from the transmit module 38 to a feed device 34. The feed device transmits to the lens, which will cause the output signals to be broadcast as narrow beam rf signals 17 to the desired communication device 12. The same signal can be transmitted to more than one feed device if point-to-multipoint communication is desired. Also, if the target communication device 12 is mobile, or if the lens antenna 14 is mobile, the output signals 78 to a communication device 12 can be directed by the controller 44 out of the feed device 34 which last received input signals from the communication device 12. When the signals transmitted to the lens antenna 14 are focused by the lens onto more than one feed device 34 of the feed device array 32, each feed device that received the signals from the communication device 12 is used to broadcast a narrow beam signal to the communication device.

The invention relates to line-of-sight microwave and millimeter wave communication. To increase the coverage area for a particular lens 14, the lens should be positioned as high as possible. Stationary lenses are preferably mounted on towers 92. The lenses of a local area network can be positioned anywhere as long as there are no obstructions which block the possible rf signals paths between the various lenses of the network. A plurality of lenses and the corresponding signal processing equipment 16 of each lens can be networked together by cable or other means to increase the information handling capacity of a lens or to provide a way of bypassing an obstruction which blocks a specific directional range. Also, a lens 14 with signal processing equipment 16 can be mounted on a satellite to provide an extended area of coverage for a network.

The communication systems as described above allow for point-to-point communication or point-to-multipoint communication. A lens 14 and corresponding signal processing equipment 16 can be used to simultaneously establish many separate communication systems between many users. For example, in FIG. 2, base station 24b is used to simultaneously establish communication systems and networks between communication devices 12o and 12p; 12g and 12h; and 12i and 12j.

There are many possible uses for this invention, including but not limited to the following:

1. Microwave Telecommunications: The small size, low power, and low costs of this technology provide the opportunity to establish a much more cost effective microwave telecommunications system than exists today. A microwave telecommunications system based on the microwave lens antenna could be installed in a developing country for a fraction of the cost of the current technology. Also, the microwave lens antenna could be used to replace the aging system of microwave communications devices, which reside in the towers covering the face of the U.S. The communication system can transmit verbal or digital data at rates which significantly exceed older microwave transmission capabilities.

2. Local Computer Networking: The microwave lens antenna technology can transmit data in the megabytes per second range, a quantum leap over the 28,800 bps Baud Modem available to computer networking today. Colleges, universities, research facilities, industry, police, etc. have requirements to link computer systems between facilities on a mission basis. This computer networking is currently accomplished by either laying specialized cables (expensive, time-consuming, and often impractical) or by linking through the telephone modem (slow data transfer). A small 6 inch diameter version of the microwave lens antenna can be linked by simply achieving a line-of-sight within a range of 75 miles. Each user can establish a security code that would ensure that the point-to-point communication was secure. The high data transmission rates can effectively link computers and projects with real-time data transfer.

3. Anti-collision Device for Automobiles: Considerable effort has been expended on the study of the use of millimeter wave sensors for use in auto anti-collision systems. General Motors has been a leader in this field. Millimeter wave radio frequencies, particularly those in the range of 96 Gigahertz (GHz), have been chosen over lower frequencies, primarily because they can be focused into a smaller effective beamwidth than is possible at the presently more widely used Ka-band (approximately 35 GHz). However, the cost of components and assembly for a system operating at 96 GHz are many more times more expensive than those operating at 35 GHz.

The Luneberg lens and the constant-K lens are capable of focusing high frequency radio waves much more effectively than conventional antennas, such as horns and parabolic antennas, in smaller sizes. Thus, the use of a Luneberg lens to focus 35 GHz may well result in a much less expensive anti-collision system.

4. Utility Meter Reading: The communication technology described herein consists of a compact microwave interrogation unit that can focus a signal into a beam width of 2 degrees or less by means of a lens. This focused beam can be aimed at a specific target and used to initiate a response, which would provide real-time identification of the subject target, as well as any number of other data elements. In addition, the system is capable of accurately determining the range between the interrogation unit and the target. The equipment required by the target consists of a simple transponder capable of transmitting the required data via a small stub antenna. The system is capable of operating at ranges up to 25 kilometers with a signal power of 0.75 watts with no danger to operator or other human or animal life.

One application of this technology would be for reading electric meters. The meter reader would be equipped with an interrogation unit. When a valid interrogation signal from the interrogation unit is sensed by the meter, the meter would respond with the meter identification number and the current reading of the electricity used. The interrogation unit would record the data, along with the current time and date of the reading. Given an appropriate location of the meter, the entire operation could be conducted while the meter reader remained in a car.

5. Airlines: Currently, airlines must rely on the airport control tower to give them an estimate of when any given flight is expected at the gate. Depending on the workload of the control tower, this communication can often be sporadic and untimely. At least one major airline is looking for its own independent communication system that would become operative between the gate and the flight-specific pilot at about 15 miles from the airport, allowing the airlines not to have to be reliant on an often overloaded control tower. The ability to know a more precise time of arrival of a given flight will increase the efficiency of service provided to airline users, and will result in a significant cost savings to the airline.

6. Automatic Teller Machines (ATM): While ATM's are everywhere in the U.S., one does not typically find them in the numerous developing countries. A highly reliable, error-free, phone line is essential to ATM operations and such a line is not normally found in developing countries. However, a communication system based on the present invention could meet the need for a highly reliable, error-free, wireless, communications medium relaying information between ATM's and the clearing bank, very reliably and in a very secure mode.

7. Medical, Educational; and Other Developing Country Applications: Communication from the more urbanized areas to the more remote areas in a developing country has been a long-standing problem. Ministers of Education often wish that educational programs designed in urban areas could be easily accessed by remote area schools. A pointto-multipoint communication system based on the present invention would make it possible to beam educational programs into numerous remote areas in voice or video mode, thus enhancing the quality of remote area education.

In developing countries, there are numerous remote area health clinics that are entirely severed from the more advanced medical knowledge that exists in urbanized areas. Often, these remote area clinics are staffed by capable medical technicians who could save numerous lives if they had better information. As with educational programs, an efficient communication system would give the remote clinics instant and reliable communications with the urban medical center in either data, voice, or video mode. Vital signs and other medical information could instantly be sent to the urban medical center for analysis, a treatment decided upon, and the information beamed back quickly to the remote clinic.

8. Backbone Link for Cellular Regions: Currently, cellular regions are linked together either by a microwave tower system supported by often unreliable, expensive radios and/or satellites. One base station based on the present invention with 20 locations engineered into it can displace 280 microwave tower antennas and 280 radios and 28 towers, resulting in a significant cost savings, while making it possible to avoid using expensive satellites, and passing on significant savings to consumers. Moreover, such a system would be more reliable and much less costly to maintain.

The embodiments shown and described above are only exemplary. We do not claim to have invented all the parts, elements, or steps described. Various modifications can be made in the construction, material, arrangement, and operation, and still be within the scope of our invention.

The restrictive description and drawings of the specific examples above do not point out what an infringement of this patent would be, but are to enable one skilled in the art to make and use the invention. The limits of the invention and the bounds of the patent protection are measured by and defined in the following claims.

We claim as our invention:

1. A microwave or millimeter wave radio frequency communication system comprising:
   a lens antenna having a dielectric material lens for focusing radio frequency signals, the lens antenna including an array of feed devices spaced about a periphery of the lens so as not to block radio frequency signals from passing through the lens from any direction;
   a first communication device communicatively connected to said antenna by information carrying signals sent from said first communication device to said antenna; and
   a plurality of second communication devices communicatively connected to said antenna by information carrying radio frequency signals which are simultaneously transmitted from the antenna to said plurality of second communication devices with the sending of said information carrying signals from said first communication device; wherein
   said antenna focusing the information carrying signals transmitted to the plurality of second communication devices into narrow beam information carrying radio frequency signals;
   information contained in said narrow beam information carrying radio frequency signals received by at least one of said plurality of second communication devices being contained in the information carrying signals sent from said first communication device to said antenna; and
   a lens antenna in a first cell of a cellular network reuses part of the frequency spectrum used by an antenna in an adjacent cell of the cellular network for transmission of narrow beam radio frequency signals within the first cell.

2. The communication system as defined in claim 1 wherein said dielectric material lens comprises a variable refractive index lens.

3. The communication system as defined in claim 1 wherein said dielectric material lens comprises a constant dielectric constant lens.

4. The communication system as defined in claim 1 wherein said lens antenna uses frequency reuse for some of the signals transmitted from the lens antenna by employing time division, code division, polarization division or space division multiplexing to the signals which use the same frequency.

5. The communication system as defined in claim 1 wherein:
   said first communication device is communicatively connected to said lens antenna by information carrying radio frequency signals which are transmitted from said first communication device to said lens simultaneously with the transmitting of said information carrying signals to said plurality of second communication devices.

6. The communication system as defined in claim 1 wherein:
   said first communication device is communicatively connected to said lens antenna by connector means.

7. The communication system as defined in claim 1 wherein:
   said plurality of second communication devices being communicatively connected to said lens antenna by information carrying radio frequency signals which are transmitted from at least one of said second communication devices to the lens antenna; and
   said lens antenna sending information contained in said signals received from said at least one of said plurality of second communication devices to said first communication device.

8. The communication system as defined in claim 7 wherein:
   said first communication device can receive and transmit separate information carrying signals simultaneously; and
   at least one of said plurality of second communication devices can receive and transmit separate information carrying signals simultaneously.

9. The communication system as defined in claim 8 wherein said lens antenna uses frequency reuse for some of the signals transmitted from or received by the antenna by employing time division, code division, polarization division or space division multiplexing to the signals which use the same frequency.

10. The communication system of claim 1, said feed devices including patch antennas.

11. The communication system of claim 1, said feed devices including end fire antennas.

12. The communication system of claim 1, said feed devices including waveguide antennas.

13. The communication system of claim 1, said feed devices being spaced apart about 360 degrees of said periphery of said lens.

14. A microwave or millimeter wave radio frequency point-to-multipoint communication system comprising:
   a lens antenna having a dielectric material lens for focusing radio frequency signals, the lens antenna including an array of feed devices spaced about a periphery of the lens so as not to block radio frequency signals from passing through the lens from any direction;

a broadcasting station which transmits information carrying signals to said lens antenna;

a plurality of communication devices communicatively connected to said lens antenna by narrow beam radio frequency information signals simultaneously transmitted from said lens antenna and received by said plurality of communication devices with the transmission of said information carrying signals from the said broadcasting station to the lens; wherein each communication device of the plurality of communication devices receiving an information carrying signal from the lens antenna which contains the same information as carried in the signal transmitted from the broadcasting station to the lens antenna, and wherein a lens antenna in a first cell of a cellular network reuses part of the frequency spectrum used by an antenna in an adjacent cell of the cellular network for transmission of narrow beam radio frequency signals within the first cell.

15. The communication system as defined in claim 14 wherein said dielectric material lens comprises a variable refractive index lens.

16. The communication system as defined in claim 14 wherein said dielectric material lens comprises a constant dielectric constant lens.

17. The communication system as defined in claim 14 wherein said lens antenna uses frequency reuse for some of the signals transmitted from the antenna by employing time division, code division, polarization division or space division multiplexing to the signals which use the same frequency.

18. The communication system as defined in claim 14 wherein:

at least one of the communication devices of the plurality of communication devices can transmit signals to said lens antenna; and said antenna transmitting signals received from said at least one communication device of the plurality of communication devices to said broadcast station.

19. The communication system as defined in claim 18 wherein said lens antenna uses frequency reuse for some of the signals transmitted from or received by the antenna by employing time division, code division, polarization division or space division multiplexing to the signals which use the same frequency.

20. The communication system as defined in claim 14 wherein at least one communication device of the plurality of communication devices comprises another lens antenna which transmits received information as narrow beam information carrying signals to other communication devices.

21. The communication system as defined in claim 20 wherein a communication device of the plurality of communication devices received narrow beam radio frequency signals from two or more lens antennas.

22. The communication system of claim 14, said feed devices including patch antennas.

23. The communication system of claim 14, said feed devices including end fire antennas.

24. The communication system of claim 14, said feed devices including waveguide antennas.

25. The communication system of claim 14, said feed devices being spaced apart about 360 degrees of said periphery of said lens.

26. A method of microwave or millimeter wave radio frequency point-to-multipoint communication, comprising:

providing a lens antenna having a dielectric material lens for focusing radio frequency signals, the lens antenna including an array of feed devices spaced about a periphery of the lens so as not to block radio frequency signals from passing through the lens from any direction;

sending information carrying signals from at least one first communication device to said lens antenna; and simultaneously transmitting narrow beam radio frequency information carrying signals from said lens antenna to a plurality of second communication devices with the sending of said information carrying signals from said at least one first communication device to the lens antenna, information contained in said narrow beam radio frequency information carrying signals received by at least one of said plurality of communication devices being contained in the information carrying signals sent from said at least one first communication device to the lens antenna, a lens antenna in a first cell of a cellular network reusing part of the frequency spectrum used by an antenna in an adjacent cell of the cellular network for transmission of narrow beam radio frequency signals within the first cell.

27. The method of claim 26, said step of transmitting narrow beam radio frequency information carrying signals from the lens antenna, comprising, reusing frequencies of some of the signals transmitted from the lens antenna by applying time division multiplexing to signals which use the same frequency.

28. The method of claim 26, said step of transmitting narrow beam radio frequency information carrying signals from the lens antenna, comprising, reusing frequencies of some of the signals transmitted from the lens antenna by applying code division multiplexing to signals which use the same frequency.

29. The method of claim 26, said step of transmitting narrow beam radio frequency information carrying signals from the lens antenna, comprising, reusing frequencies of some of the signals transmitted from the lens antenna by applying polarization division multiplexing to signals which use the same frequency.

30. The method of claim 26, said step of transmitting narrow beam radio frequency information carrying signals from the lens antenna, comprising, reusing frequencies of some of the signals transmitted from the lens antenna by applying space division multiplexing to signals which use the same frequency.

31. The method of claim 26, said step of sending information carrying signals from said at least one first communication device to the lens antenna, comprising, transmitting narrow beam radio frequency information carrying signals from said at least one first communication device to the lens antenna simultaneously with the transmission of said narrow beam radio frequency information carrying signals from said lens antenna to at least one of said plurality of second communication devices.

32. The communication system of claim 26, said providing step further comprising, spacing said feed devices apart about 360 degrees of said periphery of said lens.

33. A microwave or millimeter wave point-to-multipoint communication system, comprising:

a lens antenna having a dielectric material lens for focusing radio frequency signals, the lens antenna including an array of feed devices spaced about a periphery of the lens so as not to block radio frequency signals from passing through the lens from any direction;

a broadcasting station transmitting information-carrying signals to said lens antenna;

a plurality of communication devices, at least two of said plurality of communication devices receiving radio frequency signals simultaneously transmitted from said lens antenna using the same frequency, but carrying distinctly different information; and a lens antenna in a first cell of a cellular network reuses part of the frequency spectrum used by an antenna in an adjacent cell of the cellular network for transmission of narrow beam radio frequency signals within the first cell.

34. The communication system of claim 33, said feed devices being spaced apart about 360 degrees of said periphery of said lens.

35. A microwave or millimeter wave point-to-multipoint communication system, comprising:

a lens antenna having a dielectric material lens for focusing radio frequency signals, the lens antenna including an array of feed devices spaced about a periphery of the lens so as not to block radio frequency signals from passing through the lens from any direction;

a base station connected to receive information-carrying signals from said lens antenna;

a plurality of communication devices, at least two of said plurality of communication devices transmitting information carrying radio frequency signals simultaneously to said lens antenna using the same frequency, but carrying distinctly different information, said base station receiving said information represented by said radio frequency signals transmitted to said lens antenna; and a lens antenna in a first cell of a cellular network reuses part of the frequency spectrum used by an antenna in an adjacent cell of the cellular network for transmission of narrow beam radio frequency signals within the first cell.

36. The communication system of claim 35, said feed devices being spaced apart about 360 degrees of said periphery of said lens.

* * * * *